United States Patent [19]
Allen et al.

[11] Patent Number: 5,023,758
[45] Date of Patent: Jun. 11, 1991

[54] SINGLE ARC DISCHARGE HEADLAMP WITH LIGHT SWITCH FOR HIGH/LOW BEAM OPERATION

[75] Inventors: Gary R. Allen, Chesterland; John M. Davenport, Lyndhurst; Richard L. Hansler, Pepper Pike, all of Ohio

[73] Assignee: General Electric Company, Schenectady, N.Y.

[21] Appl. No.: 435,902

[22] Filed: Nov. 13, 1989

[51] Int. Cl.$^5$ ............................................. B60Q 1/00
[52] U.S. Cl. ................................... 362/61; 362/346; 362/318; 362/309; 362/332
[58] Field of Search .................. 362/61, 80, 296, 297, 362/328, 318, 268, 298, 301, 308, 309, 332, 346, 349

[56] References Cited

U.S. PATENT DOCUMENTS

| | | | |
|---|---|---|---|
| 1,393,877 | 10/1921 | Allen | 362/332 |
| 3,914,593 | 8/1975 | Laribe | 362/297 |
| 4,238,817 | 12/1980 | Fratty | 362/309 |
| 4,323,952 | 4/1982 | Proske | 362/318 |
| 4,494,176 | 1/1985 | Sands et al. | 362/308 |
| 4,506,315 | 3/1985 | Maekawa et al. | 362/297 |
| 4,697,225 | 9/1987 | Lindae et al. | 362/297 |
| 4,704,667 | 11/1987 | Ploeger | 362/80 |
| 4,730,240 | 3/1988 | van Meel et al. | 362/297 |
| 4,800,467 | 1/1989 | Lindae et al. | 362/297 |
| 4,885,669 | 12/1989 | Nino | 362/80 |
| 4,959,757 | 9/1990 | Nakata | 362/346 |

FOREIGN PATENT DOCUMENTS 2605086 4/1988 France ................................ 362/61
1451066 9/1976 United Kingdom ............... 362/318

Primary Examiner—Stephen F. Husar
Assistant Examiner—D. M. Cox
Attorney, Agent, or Firm—John P. McMahon; George E. Hawranko; Stanley C. Corwin

[57] ABSTRACT

An arc discharge headlamp system employs a single continuously operating arc discharge source to provide both high and low beam patterns. The continuously operating arc discharge increases lamp life and eliminates the problem in arc light source headlamp systems of momentary dimming when switching to high beam operation due to mercury condensing within source. The headlamp has an arc light source mounted horizontally within a reflector. Light from an arc light source is reflected by the reflector through a lens to form a low beam pattern. A mirror within the reflector is positioned to form a virtual image of the light source and which is directed towards a second lens concentric with the first lens to form a high beam pattern when combined with the low beam pattern. Switching between the high beam and low beam patterns is accomplished in a variety of ways. In the preferred embodiment, the second lens incorporates an electrically responsive light valve which either passes or blocks the virtual image of the arc light source. Alternatively, the mirror may be moved between a position that directs the virtual image through the lens to a position where the virtual image is not directed through the lens. Rather than moving the mirror, it may be blocked with a mask during low beam operation.

17 Claims, 3 Drawing Sheets

SINGLE ARC DISCHARGE HEADLAMP WITH LIGHT SWITCH FOR HIGH/LOW BEAM OPERATION

BACKGROUND OF THE INVENTION

1. Field of the Invention

The present invention generally relates to high efficiency vehicle headlamps employing arc discharge light sources and, more particularly, to an arc discharge headlamp in which a single arc discharge light source generates both a high beam and a low beam pattern.

2. Description of the Prior Art

Arc discharge light sources are desired to be used in vehicle headlamps. These sources have high efficiency and high brightness, which allow the height and overall size of the headlamp housings to be reduced and, therefore, have been popular for use in current vehicle headlamp styles which for vehicular design considerations require a relatively small, thin headlamp. Generally, prior art arc light source vehicle headlamps require one arc light source and housing for the low beam and one arc light source and housing for the high beam. This significantly increases the cost of the system. In addition, when the arc light source for high beam operation is initially ignited, condensed mercury momentarily drops the brightness of the beam to approximately 15% of its ultimate value. While the effect lasts less than a second, it can be objectionable when switching on the high beam lamp.

SUMMARY OF THE INVENTION

An object of the invention is to provide an improved arc discharge headlamp system in which a single continuously operating arc provides both the high and low beam patterns.

Another object of the present invention is to reduce cost and complexity of an arc light source vehicle headlamp system without sacrificing performance.

Still another object of the invention is to eliminate the problem in arc light source headlamp systems of momentary dimming when switching to high beam operation.

Briefly described, this invention provides a vehicle headlamp having an arc light source mounted horizontally within a reflector. Light from the arc light source is reflected by the reflector through a first lens to form a low beam pattern. A mirror forms a virtual image of the light source and a second lens horizontally centered with respect to said first lens receives light from said virtual image. The light from said virtual image passing through said second lens when combined with the low beam pattern forms the high beam pattern. Switching between the high beam and low beam patterns is accomplished in a variety of ways. In the preferred embodiment, the second lens incorporates an electrically responsive light valve which either passes or blocks the virtual image of the arc light source. Alternatively, the mirror may be moved between a position that directs the virtual image through the lens to a position where the virtual image is not directed through the lens. Rather than moving the mirror, it may be blocked by a movable mask during low beam operation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
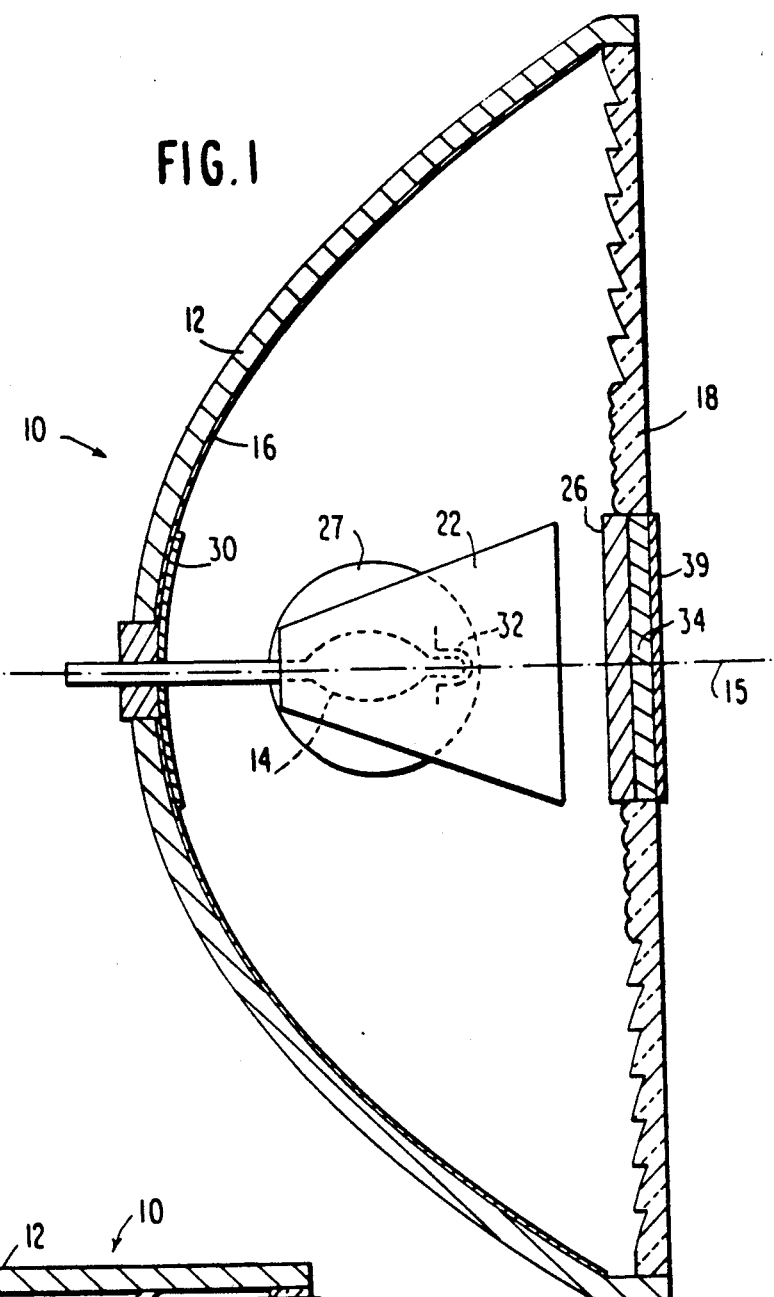
FIG. 1 is a top view, partially in section, of a single arc discharge light source headlamp which provides both high and low beam patterns according to the teachings of this invention.
Figure 2:
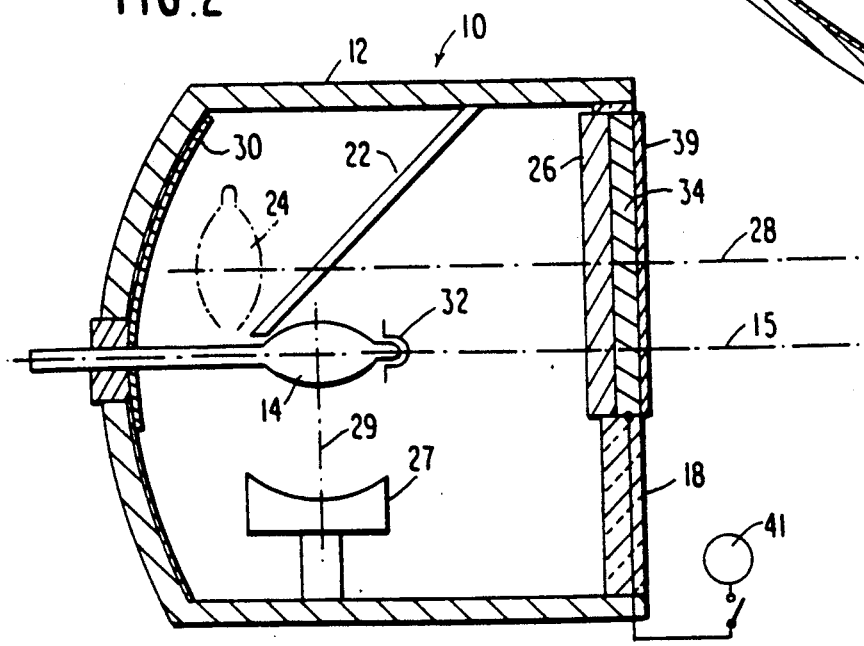
FIG. 2 is a side view, partially in section, of the headlamp shown in FIG. 1.

In the drawings, like reference numerals designate the same or similar structure throughout the several figures. Referring now to the drawings, and more particularly to FIGS. 1 and 2, there is shown a first embodiment of the invention which comprises a rectangular headlamp 10 which includes a reflector 12 with an arc light source 14, such as a metal halide arc tube, for example, positioned within the reflector 12. The reflector 12 may be made of glass or other suitable material, and the arc light source 14 may be of the type described in U.S. Pat. No. 4,868,458. The arc light source 14 has a principle longitudinal axis, defined by its electrodes (not shown), which is horizontally oriented coincident with the axis 15 of the headlamp 10. The light source should be located approximately at the focal point of the reflector 12. The manner in which the arc light source 14 is mounted within the reflector 12 is not part of the invention, and it may be mounted in any suitable manner, such as the manner used for securing arc light source in presently used vehicle arc light source headlamps.

Figure 3:
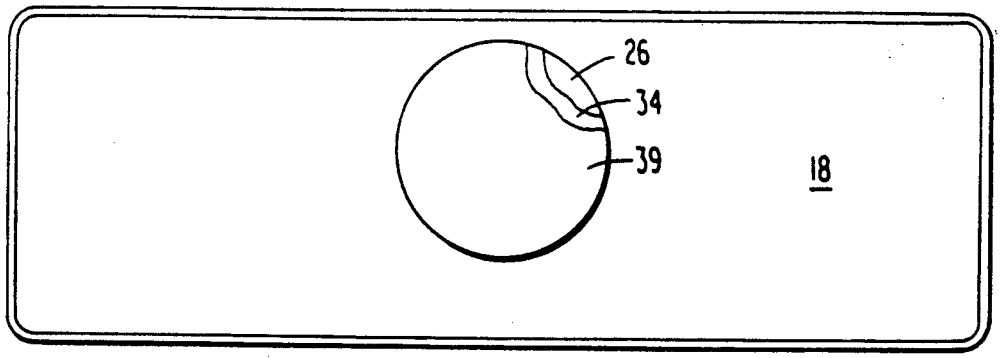
FIG. 3 is a front view of the headlamp shown in FIG. 1.

The reflector 12 is formed with parabolic rear and side surfaces and planar top and bottom surfaces defining a rectangular opening within which a rectangular prismatic lens 18 is secured. The 18 lens may be made of glass or plastic or other suitable material and may be secured within the rectangular opening of the reflector 12 in any suitable manner known in the art. The rectangular shape of the lens 18 is best illustrated in FIG. 3. Returning to FIGS. 1 and 2, the interior of the parabolic rear surface of the reflector 12 is covered with reflecting material 16, such as a metallic coating, to form a reflecting surface as is conventional.

Light from the arc light source 14 is reflected by the reflecting surface 16 and directed through the prismatic lens 18 to form the low beam pattern. According to the invention, there is provided a wedge-shaped mirror 22 which is secured to the top planar surface of reflector 12 and disposed to form a vertical virtual image of the arc light source 14. The mirror 22 is preferably inclined at an angle of approximately 45° to the axis 15 so as to direct light from the arc toward the horizontally central portion of the lens 18. The vertical virtual image of the arc produced by the mirror 22 appears as if it were a second arc light source located as indicated by the dotted line image 24 in FIG. 2. This virtual image 24 is located both above and slightly behind the arc light source 14 and is vertically oriented, although the arc light source 14 itself is horizontally oriented.

The lens 18 may be of the type presently used in rectangular arc light source automotive headlamps, modified at its horizontal center to project the high beam image of the arc as hereinafter explained. The outer portions of lens 18 form a desired low beam pattern on the road ahead of the vehicle. To form the high beam pattern, a high beam lens 26 is provided in the horizontally central region of the prismatic lens 18 in order to form and project an enlarged real image of the vertical arc image. A spherical Fresnel lens may be used for lens 26 to minimize space and weight requirements, although a convex spherical lens may be used with equal effect. The lens 26 may be bonded in an opening formed in lens 18, but preferably it is molded as an integral part of single unitary structure combining lenses 18 and 26. The lens 26 projects a high beam of light. The focal length of the lens 26 is selected so that the virtual image 24 is at or near the focus of the lens.

The lens 26 should be located so that its optical axis 28, shown in FIG. 2, is parallel to but vertically displaced above the axis 15 by an amount corresponding to the displacement of the vertical virtual image of the arc above the axis 15. Vertically, the size of the beam projected by lens 26 is determined by the ratio of the gap length between the electrodes (not shown) of the arc light source 14 to the focal length of the lens 26. Horizontally, the size of the beam projected by lens 26 is determined by the ratio of the width of the arc discharge between the electrodes of the arc light source 14 to the focal length of the lens 18.

The resulting beam shape is higher than it is wide and is not typical for an automotive high beam pattern. If desired, some horizontal spreading of the high beam pattern can be accomplished by making the mirror 22 slightly cylindrical rather than planar. Another method of spreading the light horizontally but not vertically is to use crossed cylindrical Fresnel lenses in place of the lens 26. The focal length of the lens controlling the width of the high beam component can be chosen so that the source is not quite at the focus thereby spreading the beam horizontally as much as desired while the spread in the vertical direction is held to a minimum. For example, the lower half of the Fresnel lens which causes horizontal spread may have a focal length so as to provide more foreground spreading of the light pattern than is chosen for the upper half of the lens which produces the distant pattern.

Direct light from the arc light source 14 should be buffered to avoid glare. The related light from the reflecting surface 16 should not reach the lens 26. To this end, as shown in FIGS. 1 and 2, the center portion of the reflecting surface 16 is covered with a light absorbing material 30 such as a suitable black paint. In addition, an opaque shield 32 may be attached to the end of the arc tube to block direct light from the arc light source 14 to lens 26. The shield 32 may be simply press fit on the end of the tube and held there by friction.

The mirror 22 has a wedge shape, as shown in the top view of FIG. 1, should have a high reflectance, be able to withstand high operation temperatures and should not enhance sodium loss from arc light source 14. A suitable mirror may be constructed using known multilayer dielectric thin film technology. The mirror should be designed for operation when oriented at approximately 45° to axis 15 and from which visible energy is reflected while ultraviolet energy is transmitted or absorbed and infrared energy is transmitted (i.e., a so-called "cold" mirror). A metal mirror may also be used, but in this case it must be electrically biased to retard sodium migration through the tube wall of arc light source 14. Biasing the preferred dielectric thin film reflector may also be desirable, depending on its operating temperature and electrical conductivity.

As shown in FIG. 2, additional light may be introduced into the high beam by suitably mounting a spherical mirror 27 of small radius of curvature directly below the arc light source 14 such that the vertical center line 29 of the arc gap is at the center of curvature of the mirror 27. In this way, downwardly radiating light is reflected vertically by the mirror 27 to mirror 22 and directed toward lens 26. A substantial increase in the brightness of the beam may be obtained with this construction.

There are several suitable methods for controlling the projection from the headlamp of the vertical virtual image of the arc in order to turn on and off the high beam. In a preferred embodiment, an electrically responsive light valve 34 is used. As used herein, a light valve is a device which has two states, a substantially opaque state and a substantially transparent state, which are electrically switchable. The light valve 34 is shown as overlaying the lens 26, but it will be understood the light valve may be molded into and be an integral part of the lens 26.

A commercially available nematic curvilinear aligned phase (NCAP) type of liquid crystal light valve or polymer dispersed liquid crystal (PDLC) is used in a preferred embodiment of the invention. A suitable liquid crystal light valve is manufactured by Taliq Corp. and sold by Edmonds Scientific Corp. of New Jersey. As will be appreciated by those skilled in the art, the NCAP and PDLC type of liquid crystal light valves are activated by an a.c. electrical source 41, shown schematically in FIG. 2. The advantage of the NCAP and PDLC type of liquid crystal light valves are that they allow a large fraction (more than 80%) of the light to pass when activated. In contrast, a polarizing type of light valve allows a transmission which is substantially less than 50%. The liquid crystal light valve in the off or substantial opaque state scatters the light, rather than absorbing it, so that the temperature can be kept below the upper temperature limit imposed by the materials used in the light valve.

A light control film 39 may be added to the optical system to reduce any glare associated with the scattered light from the light valve 34. The light control film may be adhered to, bonded to or molded into the surface of the light valve 34 and lens 26 combination. The light control film contains tiny vanes, and the vanes are horizontally disposed to pass horizontally directed light but absorb upward and downward scattered light. Film of this type is made from polycarbonate and is available from the 3M Company under the trade name Light Control Film.

Figure 4:
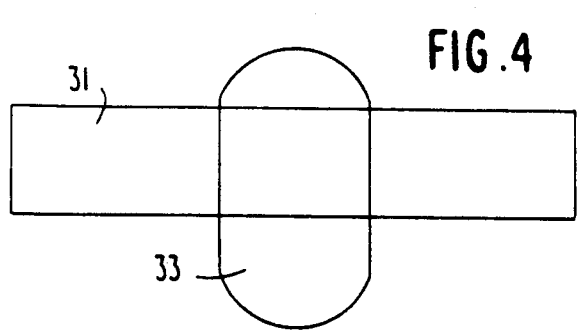
FIG. 4 is a diagram of a beam pattern formed by an embodiment of the headlight.

In operation, light from the arc light source 14 is reflected by reflecting surface 16 through prismatic lens 18 for both low and high beams. The high beam is formed by switching the light valve 34 to its substantially transparent state. In this state, light from the arc light source 14 is reflected by mirror 22 through lens 26, light valve 34 and control film 39. Owing to the inversion of the image by lens 26, the high beam pattern has the general shape illustrated in FIG. 4, comprised of a low beam lobe 31 and an overlapping high beam lobe 33. For low beam operation, the light valve 26 is switched to its substantially opaque state, thereby blocking the image from the mirror 22 so that only the low beam lobe 31 is projected. Note that the arc light source 14 is not turned on or off between high and low beam operation. This leads to increased lamp life and avoids the dimming due to mercury condensing within the light source otherwise occurring when switching from high to low beam light sources.

Figure 5:
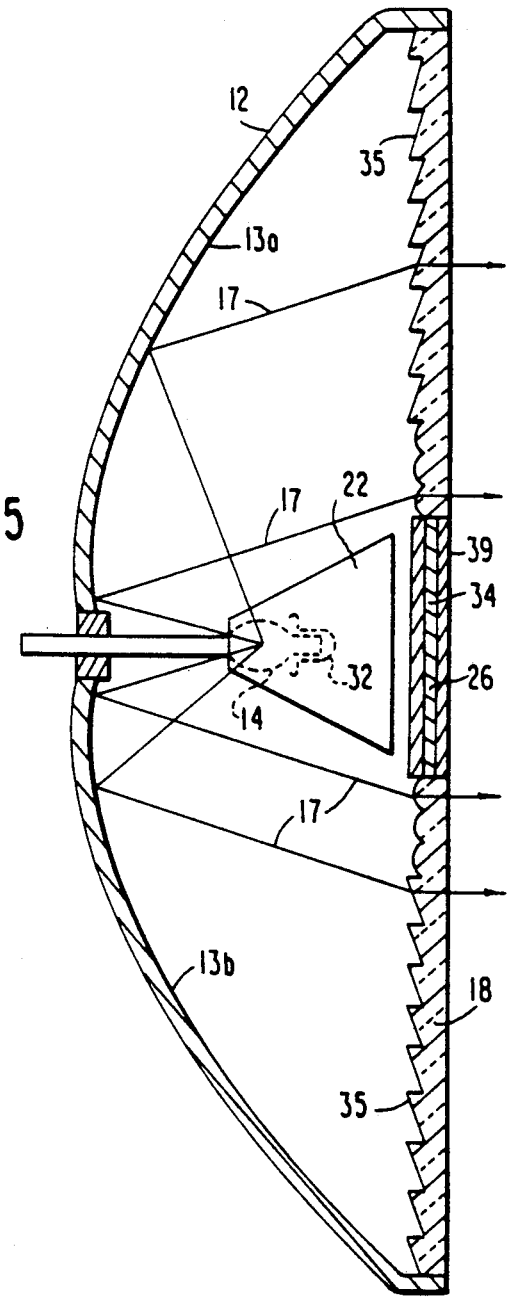
FIG. 5 is a top view, partially in section, similar to that shown in FIG. 1 of another embodiment of a discharge headlamp in accordance with the teachings of the present invention.

Another structure to prevent the related direct light from the reflecting surface 16 from reaching lens 26 is shown in FIG. 5. This structure splits the parabolic rear surface of reflector 12 and rotates each half around its focus sufficiently so that the reflected light from arc light source 14 diverges sufficiently to miss the lens 26. More specifically, the parabolic rear surface of reflector 12 is divided into two halves 13a and 13b and each half is partially rotated about the reflector focus to a point where the rays 17 from the arc light source 14 diverge sufficiently so as to miss the lens 26. More particularly, the rays 17 reflected off of the back portion of reflector 12 are diverted sufficiently to miss the lens 26. The prisms 35 of lens 18 located in the outer portions of the lens 18 may be designed to compensate for the divergence of the light from the two halves of the reflector. While this structure eliminates the need for the light absorbing material 30, the shield 32 is still used.

Figure 6:
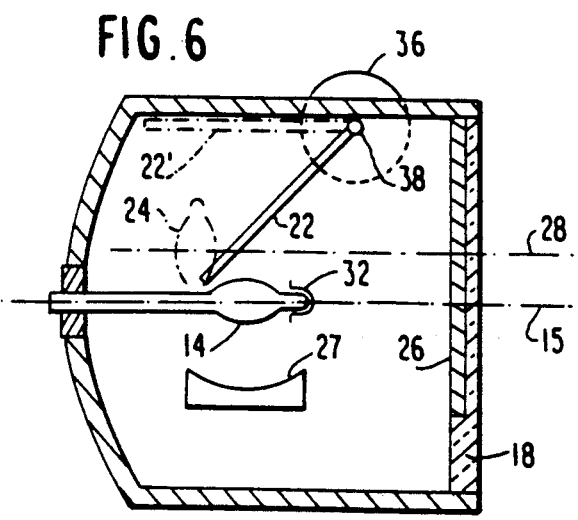
FIG. 6 is a side view, partially in section, of an alternate embodiment of the headlamp incorporating a pivoting mirror.

An alternate embodiment for controlling the formation of the high beam is to mechanically move the mirror 22 rather than using a light valve 34. This arrangement is illustrated in FIG. 6. A small rotary solenoid 36 is used to move the mirror 22. In the high beam position, the mirror 22 is as shown in solid line, but in the low beam position, the mirror 22' is as shown in dotted line. Thus, in the low beam position, no light is reflected by the mirror 22 toward lens 26. The mirror 22 is attached along one edge to an axle 38 which is rotated by the solenoid 36. Since a rotary solenoid normally rotates only in one direction, a spring (not shown) may be added to bias the mirror 22 to the low beam position. Thus, when energized, the rotary solenoid 36 rotates the mirror 22 downwardly to the high beam position. When the solenoid 36 is de-energized, the spring bias returns the mirror 22 to its low beam position. Again, the construction of the mirror and its electrical bias must be carefully controlled to avoid sodium loss problems associated with its close proximity to the operating arc light source.

Figure 7:
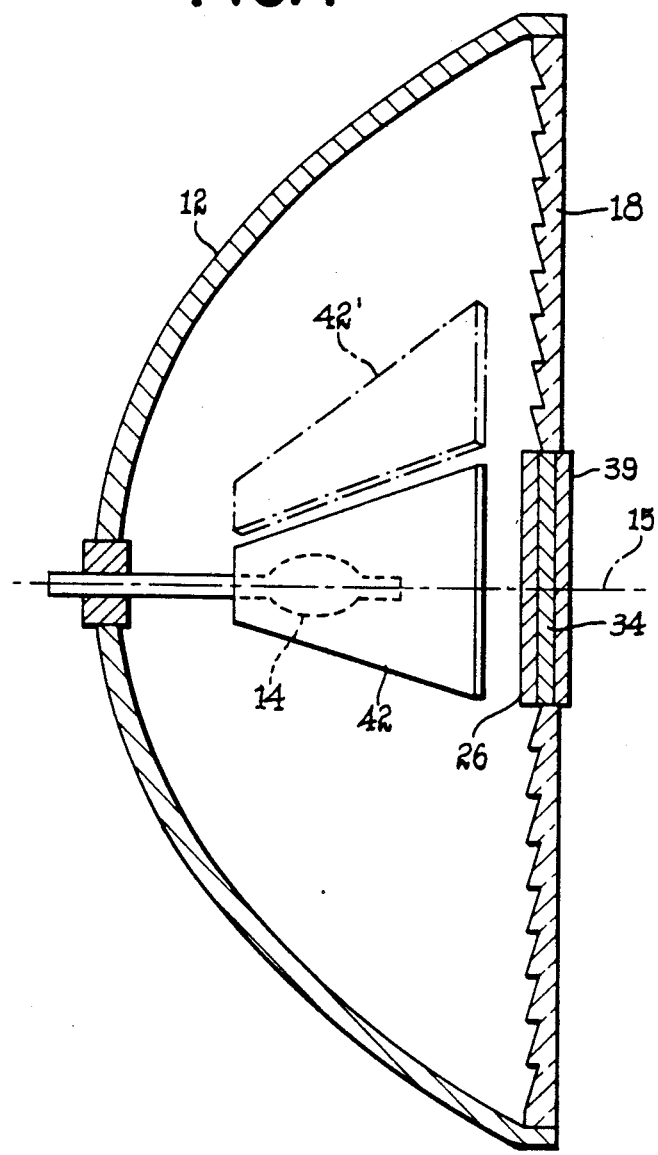
FIG. 7 is a top view, partially in section, of an alternate embodiment of the headlamp employing a pivoting mask.
Figure 8:
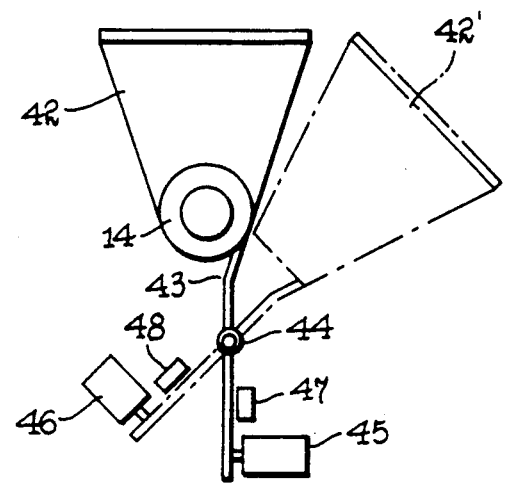
FIG. 8 is a front view showing the pivoting mask and its relation with the arc light source.

Referring now to FIGS. 7 and 8, an alternative structure to control the high beam light is to provide a movable mask 42 which may be rotated between two positions, one position shown in solid line blocking light from the image from lens 26 and one 42' shown dotted clear of mirror 22 (not shown in these figures for purposes of clarity of illustration). The mask 42 is carried by an arm 43 which is mounted to a pivot point 44. The arm 43 extends beyond the pivot point 44 and moves between two solenoids 45 and 46 and latched by permanent magnets 47 and 48. The solenoids have armatures that, when the solenoids are energized, strike the arm 43 causing it to rotate about pivot point 44. The permanent magnets 47 and 48 act as stops and hold the arm until associated solenoid is again energized. It will be appreciated that in this embodiment, like the embodiment shown in FIG. 6, no light valve is required for switching between high and low beam; however, this arrangement requires less energy. More specifically, energy is only required to effect the switching between the high and low beam positions, and no energy is required to maintain the mask 42 in either of these two positions.

By requiring only one headlamp housing on each side of the car, the complexity and cost of the system is reduced and the performance improved over a system in which separate high and low beams are produced by separate arc light sources in separate housings. Since the arc light source is not turned off and on, the number of starts is greatly reduced, a factor which increases lamp life. The dimming due to mercury condensing within the light source is also avoided in switching to the high beam.

While the invention has been described in terms of a several preferred embodiments, those skilled in the art will recognize that the invention can be practiced with modification within the spirit and scope of the appended claims.

Having thus described our invention, what we claim as new and desire to secure by Letters Patent is as follows:

1. An arc discharge headlamp for producing a high beam pattern and a low beam pattern, comprising in combination:
   a reflector having a parabolic reflecting surface and an opening;
   an arc light source positioned within said reflector near the focal point of said reflecting surface;
   a first lens at said opening, light from said arc light source being reflected by said reflecting surface toward said first lens and passing therethrough to form said low beam pattern;
   a mirror within said reflector configured and positioned to form a virtual image of said arc light source;
   a second lens at said opening horizontally centered with respect to said first lens for receiving light from said virtual image of said arc light source; and
   means for controlling light from said virtual image passing through said second lens, said light from said virtual image when allowed to pass through said second lens forming at least a portion of said high beam pattern.

2. The arc discharge headlamp recited in claim 1 wherein:
   said headlamp has a longitudinal axis extending generally horizontally, and
   said mirror is positioned above said arc light source and inclined at an angle to said longitudinal axis of the headlamp to form a vertical virtual image of said arc light source.

3. The arc discharge headlamp recited in claim 2 wherein said mirror is planar.

4. The arc discharge headlamp recited in claim 2 wherein said mirror is cylindrical.

5. The arc discharge headlamp recited in claim 2 wherein said means for controlling light comprises a light valve.

6. The arc discharge headlamp recited in claim 5 wherein said light valve is integral with said second lens.

7. The arc discharge headlamp recited in claim 5 further comprising a light control film overlying said second lens for controlling vertical dispersion of light.

8. The arc discharge headlamp recited in claim 5 wherein said light valve is a liquid crystal light valve.

9. The arc discharge headlamp recited in claim 2 wherein said means for controlling light from said virtual image through said second lens comprises means for moving said mirror between a first position where light is reflected toward said second lens and a second position where no light is reflected by said mirror toward said second lens.

10. The arc discharge headlamp recited in claim 9 wherein said means for moving said mirror comprises:
an axle to which said mirror is attached at one edge thereof; and
a rotary solenoid having an armature attached to said axle, said rotary solenoid being operable to rotate said axle.

11. The arc discharge headlamp recited in claim 2 wherein said means for controlling light comprises a mask movable between a first position covering said mirror and a second position uncovering said mirror.

12. The arc discharge headlamp recited in claim 11 wherein said mask is attached to a pivoting arm and further comprising:

first and second solenoids operable to move said pivoting arm between said first and second positions; and
first and second permanent magnets for latching said pivoting arm in either of said first or second positions.

13. The arc discharge headlamp recited in claim 2 further comprising a second mirror positioned below said arc light source to reflect light from the source toward the first mentioned mirror.

14. The arc discharge headlamp recited in claim 13 wherein said second mirror is a spherical mirror.

15. The arc discharge headlamp recited in claim 1 wherein said second lens is a Fresnel lens.

16. The arc discharge headlamp recited in claim 1 wherein said second lens has a focal length of such a value that said virtual image is located at substantially the focus of said second lens.

17. The arc discharge headlamp recited in claim 2 wherein said second lens has an optical axis substantially parallel to said headlamp longitudinal axis but vertically displaced above said headlamp longitudinal axis by an amount substantially equal to the displacement of the arc in said vertical virtual image above said headlamp longitudinal axis.

* * * * *